US009879207B2

(12) United States Patent
Tamai et al.

(10) Patent No.: US 9,879,207 B2
(45) Date of Patent: Jan. 30, 2018

(54) CLEANING FILLING LIQUID, CARTRIDGE, CLEANING FILLING METHOD, AND INKJET RECORDING DEVICE

(71) Applicants: Takashi Tamai, Kanagawa (JP); Tomohiro Inoue, Kanagawa (JP); Hiroshi Gotou, Kanagawa (JP); Michihiko Namba, Kanagawa (JP); Akihiko Gotoh, Kanagawa (JP); Kiyofumi Nagai, Kanagawa (JP)

(72) Inventors: Takashi Tamai, Kanagawa (JP); Tomohiro Inoue, Kanagawa (JP); Hiroshi Gotou, Kanagawa (JP); Michihiko Namba, Kanagawa (JP); Akihiko Gotoh, Kanagawa (JP); Kiyofumi Nagai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 18 days.

(21) Appl. No.: 15/046,201

(22) Filed: Feb. 17, 2016

(65) Prior Publication Data
US 2016/0160161 A1    Jun. 9, 2016

Related U.S. Application Data

(63) Continuation of application No. 13/755,257, filed on Jan. 31, 2013, now abandoned.

(30) Foreign Application Priority Data

Feb. 1, 2012  (JP) ................................ 2012-019920

(51) Int. Cl.
*B41J 2/21*    (2006.01)
*C11D 7/32*    (2006.01)
(Continued)

(52) U.S. Cl.
CPC .......... *C11D 7/3263* (2013.01); *B08B 9/0321* (2013.01); *B41J 2/17559* (2013.01);
(Continued)

(58) Field of Classification Search
CPC .... B41M 5/0011; B41M 5/0017; B41M 7/00; B41M 7/0072; B41M 5/52; B41M 5/5218;
(Continued)

(56) References Cited

U.S. PATENT DOCUMENTS 4,647,310 A    3/1987    Shimada et al.
4,711,668 A   12/1987    Shimada et al.
(Continued)

FOREIGN PATENT DOCUMENTS

JP    H11-58776      3/1999
JP    2000-127419    5/2000
(Continued)

OTHER PUBLICATIONS

Office Action dated Oct. 20, 2015 in corresponding patent application No. 2012-019920.

*Primary Examiner* — Manish S Shah
(74) *Attorney, Agent, or Firm* — Oblon, McClelland, Maier & Neustadt, L.L.P.

(57) ABSTRACT

A cleaning filling liquid for inkjet device including water; 10.0% by mass to 45% by mass per whole amount of the cleaning filling liquid of an amide compound having following formula (1).

(Continued)

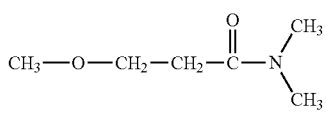

(1)

13 Claims, 4 Drawing Sheets

(51) Int. Cl.
B41J 29/17 (2006.01)
C09D 9/00 (2006.01)
C11D 3/32 (2006.01)
B41J 2/175 (2006.01)
B08B 9/032 (2006.01)
B41J 2/20 (2006.01)

(52) U.S. Cl.
CPC ............ B41J 2/20 (2013.01); B41J 29/17 (2013.01); C09D 9/00 (2013.01); C11D 3/32 (2013.01); *Y10T 137/0318* (2015.04)

(58) Field of Classification Search
CPC ......... C09D 11/36; C09D 11/40; C09D 11/30; C09D 11/38; C09D 11/322; C09D 11/328; C09D 11/101; C09D 11/005; C09D 11/54; C09D 11/52; B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60

See application file for complete search history.

(56) References Cited

U.S. PATENT DOCUMENTS

| | | | |
|---|---|---|---|
| 4,793,860 A | 12/1988 | Murakami et al. | |
| 5,431,720 A | 7/1995 | Nagai et al. | |
| 5,462,592 A | 10/1995 | Murakami et al. | |
| 5,514,208 A | 5/1996 | Nagai et al. | |
| 5,622,550 A | 4/1997 | Konishi et al. | |
| 5,810,915 A | 9/1998 | Nagai et al. | |
| 5,879,439 A | 3/1999 | Nagai et al. | |
| 5,882,390 A | 3/1999 | Nagai et al. | |
| 5,952,048 A | 9/1999 | Tsubuko et al. | |
| 5,972,082 A | 10/1999 | Koyano et al. | |
| 5,993,524 A | 11/1999 | Nagai et al. | |
| 6,120,589 A | 9/2000 | Bannai et al. | |
| 6,231,652 B1 | 5/2001 | Koyano et al. | |
| 6,261,349 B1 | 7/2001 | Nagai et al. | |
| 6,613,136 B1 | 9/2003 | Arita et al. | |
| 6,688,737 B2 | 2/2004 | Nagai et al. | |
| 6,918,662 B2 | 7/2005 | Arita et al. | |
| 7,094,813 B2 | 8/2006 | Namba et al. | |
| 7,278,726 B2 | 10/2007 | Nagai | |
| 7,284,851 B2 | 10/2007 | Bannai et al. | |
| 7,370,952 B2 | 5/2008 | Inoue et al. | |
| 7,490,930 B2 | 2/2009 | Morohoshi et al. | |
| 7,682,011 B2 | 3/2010 | Namba et al. | |
| 7,699,457 B2 | 4/2010 | Namba et al. | |
| 7,810,919 B2 | 10/2010 | Kojima et al. | |
| 7,812,068 B2 | 10/2010 | Habashi et al. | |
| 7,919,544 B2 | 4/2011 | Matsuyama et al. | |
| 7,938,527 B2 | 5/2011 | Ohshima et al. | |
| 7,950,793 B2 | 5/2011 | Aruga et al. | |
| 8,029,122 B2 | 10/2011 | Kojima et al. | |
| 8,044,114 B2 | 10/2011 | Habashi et al. | |
| 8,100,504 B2 | 1/2012 | Yokohama et al. | |
| 8,109,622 B2 | 2/2012 | Goto et al. | |
| 8,118,419 B2 | 2/2012 | Morohoshi et al. | |
| 8,142,849 B2 | 3/2012 | Ohshima et al. | |
| 8,173,227 B2 | 5/2012 | Morohoshi et al. | |
| 8,242,201 B2 | 8/2012 | Goto et al. | |
| 8,252,207 B2 | 8/2012 | Namba et al. | |
| 2002/0083866 A1 | 7/2002 | Arita et al. | |
| 2002/0096085 A1 | 7/2002 | Gotoh et al. | |
| 2003/0010252 A1 | 1/2003 | Arita et al. | |
| 2003/0038869 A1 | 2/2003 | Kaneko et al. | |
| 2003/0064206 A1 | 4/2003 | Koyano et al. | |
| 2003/0076394 A1 | 4/2003 | Gotoh et al. | |
| 2003/0107632 A1 | 6/2003 | Arita et al. | |
| 2005/0007431 A1 | 1/2005 | Koyano et al. | |
| 2005/0168552 A1 | 8/2005 | Arita et al. | |
| 2006/0176349 A1 | 8/2006 | Nagai et al. | |
| 2007/0197685 A1 | 8/2007 | Aruga et al. | |
| 2008/0233363 A1 | 9/2008 | Goto | |
| 2008/0302268 A1 | 12/2008 | Arita et al. | |
| 2009/0047431 A1* | 2/2009 | Hatada ................ C09D 11/101 | |
| | | | 427/256 |
| 2009/0114121 A1 | 5/2009 | Morohoshi et al. | |
| 2009/0130313 A1 | 5/2009 | Ohshima et al. | |
| 2009/0237445 A1* | 9/2009 | Park .................... B41J 2/16552 | |
| | | | 347/28 |
| 2009/0239044 A1 | 9/2009 | Habashi et al. | |
| 2009/0263632 A1 | 10/2009 | Kojima et al. | |
| 2010/0020142 A1 | 1/2010 | Bannai et al. | |
| 2011/0050788 A1 | 3/2011 | Imamura et al. | |
| 2011/0074866 A1 | 3/2011 | Imamura et al. | |
| 2011/0205288 A1 | 8/2011 | Matsuyama et al. | |
| 2011/0216123 A1 | 9/2011 | Tamai et al. | |
| 2011/0234692 A1 | 9/2011 | Haijima et al. | |
| 2011/0292114 A1 | 12/2011 | Sao et al. | |
| 2011/0300353 A1 | 12/2011 | Habashi et al. | |
| 2011/0310166 A1 | 12/2011 | Namba et al. | |
| 2011/0316947 A1 | 12/2011 | Kojima et al. | |
| 2012/0044293 A1 | 2/2012 | Morohoshi et al. | |
| 2012/0098883 A1 | 4/2012 | Matsuyama et al. | |
| 2012/0207983 A1 | 8/2012 | Matsuyama et al. | |
| 2012/0236066 A1 | 9/2012 | Tamai et al. | |
| 2012/0293582 A1 | 11/2012 | Goto et al. | |
| 2012/0320133 A1 | 12/2012 | Namba et al. | |
| 2012/0320137 A1 | 12/2012 | Fujii et al. | |
| 2012/0328853 A1 | 12/2012 | Matsuyama et al. | |
| 2013/0002776 A1 | 1/2013 | Nagashima et al. | |
| 2013/0176369 A1* | 7/2013 | Gotou .................... B41J 2/2107 | |
| | | | 347/100 |

FOREIGN PATENT DOCUMENTS

| | | |
|---|---|---|
| JP | 2001-049292 | 2/2001 |
| JP | 2003-276211 | 9/2003 |
| JP | 2005-047885 | 2/2005 |
| JP | 2007-146002 A | 6/2007 |
| JP | 4290486 | 4/2009 |
| JP | 2010-180391 | 8/2010 |
| JP | 2010-227729 | 10/2010 |
| JP | 2010-228400 | 10/2010 |
| JP | 2011-068838 | 4/2011 |
| JP | 2013-006294 | 1/2013 |
| WO | WO 2012111855 A1 * | 8/2012 .......... B41M 5/0011 |

* cited by examiner

CLEANING FILLING LIQUID, CARTRIDGE, CLEANING FILLING METHOD, AND INKJET RECORDING DEVICE

CROSS-REFERENCE TO RELATED APPLICATIONS

This patent application is a continuation application of U.S. application Ser. No. 13/755,257, filed Jan. 31, 2013, the disclosure of which is incorporated herein by reference in its entirety. The parent application claims priority pursuant to 35 U.S.C. § 119 to Japanese Patent Application No. 2012-019920, filed on Feb. 1, 2012, in the Japan Patent Office, the entire disclosure of which is hereby incorporated by reference herein.

FIELD OF THE INVENTION

The present invention relates to a cleaning filling liquid, a cartridge, a cleaning filling method, and an inkjet recording device.

BACKGROUND OF THE INVENTION

Ink cartridge has a liquid flow channel such as an ink flow member between ink storage and ink outlet. When the ink cartridge is recycled, the liquid flow channel must be cleaned to assure performance of the recycled cartridge.

An inkjet head is composed of a nozzle having an orifice, wherein the diameter of the orifice is not more than 50 μm, a pressure generator, a liquid container, a filter, and so on. Each component is processed precisely and therefore each inkjet head has multiple inkjet nozzles. Therefore, before shipping, the inkjet head is tested with test ink to ensure that all the components work normally and not result in a jetting failure. The test ink used for the test must be cleaned up to avoid leak of the test ink at the time of transportation, or to avoid nozzle clog due to aggregation of the test ink.

For cleaning up the test ink, Patent Literature 1, Japanese Patent Application Laid-Open (JP-A) No. 2000-127419, discloses a solution including a main solvent such as water, surfactant, and wetting agent without solid content. Patent Literature 2, JP-A No. 2001-49292, discloses maintenance liquid and cleaning liquid to clean up residual materials that adhere to inside of nozzle.

The filling liquid is filled and left in inkjet recording apparatus until inkjet ink is filled. Therefore, aqueous solution including surfactant is used to ensure refilling property of the inkjet ink. Patent Literature 3, JP-A No. 2010-227729, discloses a filling liquid including silicone oil.

Patent Literature 4, JP-A No. 2005-8735, discloses a cleaning liquid including N,N-dimethyl-β-methoxypropionamide, water, and surfactant.

Patent Literature 5, JP-A No. 2005-47885, discloses a cleaning liquid including N,N-dimethyl-β-alkoxypropionamide, wherein the alkoxy group has 3 to 18 of carbon atoms. Patent Literature 5 discloses that the number of the carbon atoms is preferably 4 to 12, more preferably 5 to 12.

BRIEF SUMMARY OF THE INVENTION

Recently, an image having high resolution or patterning accuracy is required in inkjet recording. Therefore, smaller curving tolerance of jetting liquid and greater accuracy of jetting property is required. In addition, because the inkjet ink tends to have a high solid content, it becomes more difficult to clean up the liquid flow channel, particularly inside of the nozzle, so as to prevent defects in the recycled cartridge.

Therefore, conventional cleaning liquid has a lack of cleaning property. Even if the conventional cleaning liquid has enough cleaning property, the cleaning liquid has disadvantages such as low filling property of the inkjet ink, which causes jetting defect. In addition, the cleaning liquid swells adhesive agent in the head to decrease strength of the head, or the cleaning liquid erodes metal portions of the liquid flow channel, when it is storaged before filling the inkjet ink, which may decrease jetting stability.

The cleaning filling liquid, which is the means for solving the aforementioned problems, comprises: water; and 10.0% by mass to 45% by mass per whole amount of the cleaning filling liquid of an amide compound of structural formula (1).

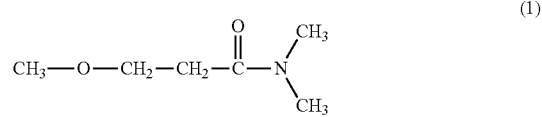

The present invention provides the cleaning filling liquid for inkjet device having high cleaning performance as a cleaning liquid and excellent function as a filling liquid that does not cause problems such as aggregation of test ink, or erosion of metal portions of the liquid flow channel, in storage term.

DETAILED DESCRIPTION OF THE INVENTION

Figure 1:
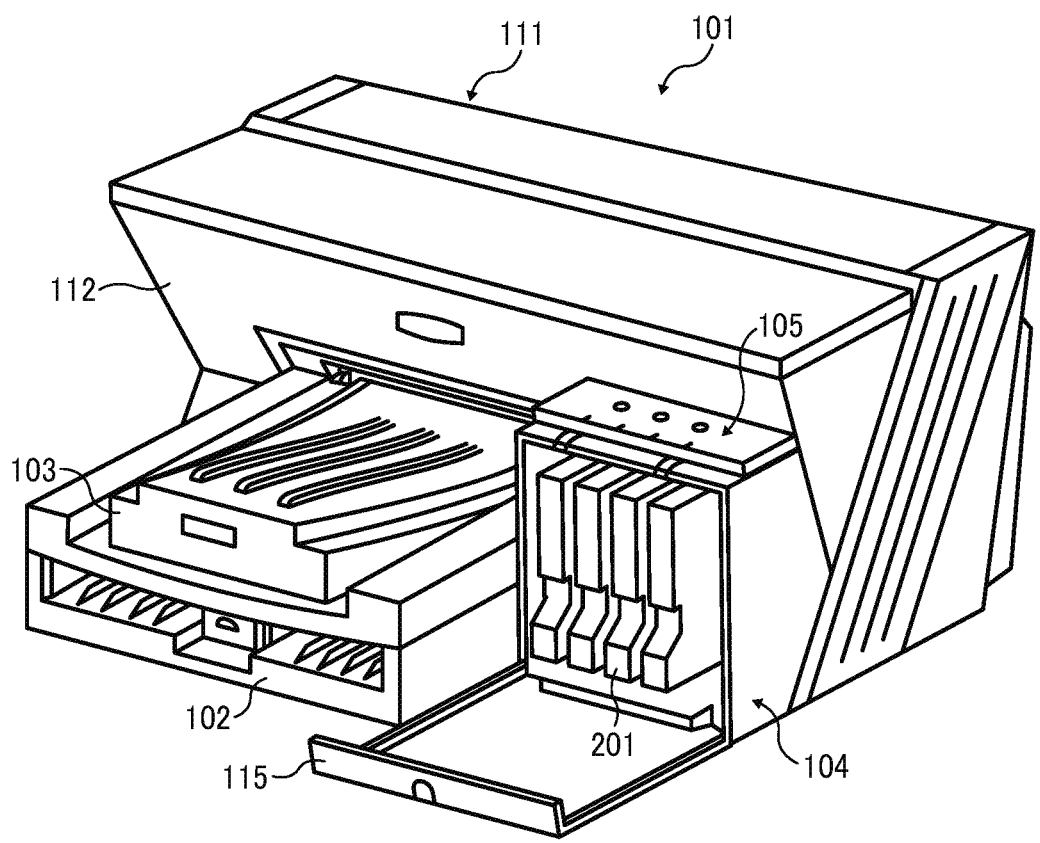
FIG. 1 shows a perspective view of an inkjet recording apparatus.

The embodiments of the present invention will be described in detail.

In a first embodiment the present invention provide a cleaning filling liquid which includes water; and 10.0% by mass to 45% by mass per whole amount of the cleaning filling liquid of an amide compound of structural formula (1).

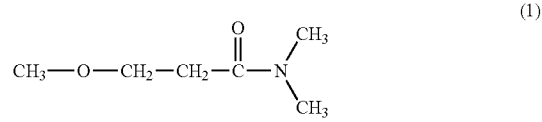

In a second embodiment the cleaning filling liquid further comprises a polyether modified silicone oil.

In a third embodiment the present invention provides a cartridge including: a container containing the cleaning filling liquid according to the embodiments.

In a fourth embodiment the present invention provides a cleaning filling method for an ink cartridge comprising: cleaning a liquid flow channel by allowing passage of the cleaning filling liquid according the first or second embodiments, and filling the cleaning filling liquid in the liquid flow channel.

The present invention also includes an inkjet recording device comprising: the flow channel, wherein the flow channel is cleaned and filled by the cleaning filling method according to the fourth embodiment.

The inventors have determined that the cleaning filling liquid containing the amide compound of formula (1) is easily mixed with the test ink and thus enhances cleaning performance. The amide compound has a function to mix between water-soluble solvent having high equilibrium water content and relatively hydrophobic organic solvent uniformly. Therefore, the amide compound is preferably used with organic solvent. In addition, the amide compound prevents not only aggregation of cleaning residues but also aggregation of the inkjet ink, because the cleaning filling liquid is mixed with the inkjet ink immediately, in filling the cleaning filling liquid. Moreover, the amide compound has a high moisture-retaining property and drying resistance, because the amide compound has a high boiling point (216° C.) and high equilibrium water content (39.2% by mass at 23° C. and 80% RH). Therefore, the cleaning filling liquid is available not only for the cleaning liquid but also as a filling liquid or partially filling liquid.

The amount of the amide compound is preferably 10.0% by mass to 45.0% by mass per whole amount of the cleaning filling liquid. When the amount is less than 10% by mass, the aforementioned functions may not be obtained adequately. When the amount is more than 45.0% by mass, the cleaning filling liquid may erode a portion of the liquid flow channel to adversely affect jetting property.

In a preferred embodiment, a silicone oil is included in for the cleaning filling liquid. The silicone oil functions to prevent a tiny residual material to adhere on the liquid flow channel or head, because the silicone oil acts as a mold release agent. When the silicone oil is used solely and not according the present invention, lower amount of the silicone oil must be used, because the silicone oil decreases storage stability. However, when the silicone oil is used in combination with the amide compound as according to the invention, higher amount of the silicone oil can be used. In this case, the cleaning filling liquid, which is left on the surface of the liquid flow channel or head, acts as coat to prevent the inkjet ink to adhere on the liquid flow channel or the head.

The amount of the silicone oil per whole amount of the cleaning filling liquid is preferably 0.1% by mass to 5.0% by mass, more preferably 1.0% by mass to 2.5% by mass. When the amount is less than 0.1% by mass, the aforementioned functions may not be obtained. When the amount is more than 5.0% by mass, storage stability of the cleaning filling liquid may decrease.

The silicone oil is a linear polymer composed of difunctional siloxane units, which has relatively low degree of polymerization. In one preferred embodiment, a modified silicone oil may be used.

The modified silicone oil is a compound that a part of methyl group of the dimethylsilicone oil is replaced with an organic group. The modified silicone oil may be classified as a reactive silicone oil and a non-reactive silicone oil.

Examples of the reactive silicone oil include an amino modified compound, an epoxy modified compound, a carboxy modified compound, and a methacryl modified compound. Examples of the non-reactive silicone oil include a polyether modified compound, a methyl styryl modified compound, a long-chain alkyl modified compound, a fluoro modified compound, and a phenyl modified compound.

Among them, the polyether modified silicone oil is preferred, when a surfactant is used in the cleaning filling liquid. The polyether modified silicone oil has appropriate dispersion property to liquid better than dimethyl silicone oil, that increases storage stability of the cleaning filling liquid. Therefore, the polyether modified silicone oil has a function to prevent fixing. In addition, the polyether modified silicone oil has a polyoxyalkylene group, which is an adduct of ethylene oxide and propylene oxide, in dimethyl siloxane. Therefore, hydrophile-Lipophile Balance (HLB) can be controlled variedly depending on liquid for ejection by adjusting number of the polyoxyalkylene group. Normally, HLB of the modified silicone oil is 5 to 10, and HLB of the non-modified silicone oil is 0.

In a further embodiment, the cleaning filling liquid may include not only the amide compound, water, and the silicone oil, but also at least one of a water-soluble organic solvent, a surfactant, and other additives conventionally known.

Water may be used as solvent in combination with the water-soluble organic solvent.

The amount of the water-soluble organic solvent is preferably 5% by mass to 20% by mass per whole amount of the cleaning filling liquid.

Examples of the water-soluble organic solvent include polyhydroxy alcohols such as ethylene glycol, diethylene glycol, triethylene glycol, polyethylene glycol, polypropylene glycol, 1,3-butanediol, 3-methyl-1,3-butanediol, 1,5-pentanediol, 1,6-hexanediol, glycerin, diglycerin, 1,2,3-butanetriol, 1,2,4-butanetriol, 1,2,6-hexanetriol, and petriol; polyhydroxy alcohol alkyl ethers such as ethyleneglycolmonoethylether, ethyleneglycolmonobutylether, diethyleneglycolmonomethylether, diethyleneglycolmonoethylether, diethyleneglycolmonobuthylether, tetraethyleneglycolmonomethylether, and propyleneglycolmonoethylether; polyhydroxy alcohol aryl ethers such as ethyleneglycolmonophenylether, and ethyleneglycolmonobenzilether; nitrogen-containing heterocyclic compounds such as N-methyl-2-pyrolidone, N-hydroxyethyl-2-pyrolidone, 2-pyrolidone, 1,3-dimethylimidazolidinone, and ε-caprolactam; amides such as formamide, N-methylformamide, and N,N-dimethylformamide; amines such as monoethanolamine, diethanolamine, triethanolamine, monoethylamine, diethylamine, and triethylamine; sulfur-containing compounds such as dimethylsulfoxide, sulfolane, and thio-diethanol; propylene carbonate, ethylene carbonate, and γ-butyrolactone.

In addition, by use of a water-soluble organic solvent having a high equilibrium water content, even when water in the cleaning filling liquid evaporates and reaches moisture equilibrium, the water-soluble organic solvent retains a large amount of water, thereby suppressing outstanding rise in viscosity of the cleaning filling liquid.

In one preferred embodiment, a water-soluble organic solvent having a high equilibrium water content means a water-soluble organic solvent having a equilibrium water content of 30% by mass or more, and preferably 40% by mass or more, at a temperature of 23° C. and a humidity of 80%. Note that the equilibrium water content means the water content when a mixture of a water-soluble organic solvent and water is opened at a constant temperature and humidity in the air, and evaporation of water in the solution and absorption of water from the air into the ink are at equilibrium state.

Specifically, a saturated potassium chloride aqueous solution is used to control temperature and humidity in the desiccator, the temperature and humidity in a desiccator are kept at 23° C.±1° C. and 80%±3% respectively, petri dishes each containing 1 g of the water-soluble organic solvent weighed are stored inside this desiccator until no mass change occurs, and the equilibrium water content (%) is calculated by the expression:

Equilibrium water content (%)=(amount of water absorbed in organic solvent)/(amount of organic solvent+water absorbed in organic solvent)×100.

In this embodiment, a polyol having an equilibrium water content of 30% by mass or more at a temperature of 23° C. and a humidity of 80% is preferably used as the water-soluble organic solvent having the high equilibrium water content. Specific examples of the water-soluble organic solvent include 1,2,3-butanetriol (boiling point: 175° C./33 hPa, 38% by mass), 1,2,4-butanetriol (boiling point: 190° C. to 191° C./24 hPa, 41% by mass), glycerin (boiling point: 290° C., 49% by mass), diglycerin (boiling point: 270° C./20 hPa, 38% by mass), diethylene glycol (boiling point: 245° C., 43% by mass), triethylene glycol (boiling point: 285° C., 39% by mass), tetraethylene glycol (boiling point: 324° C. to 330° C., 37% by mass), and 1,3-butanediol (boiling point: 203° C. to 204° C., 35% by mass). Of these, glycerin is preferably used, because the viscosity of glycerin decreases upon containing water.

The surfactant is optionally used for increasing cleaning performance by decreasing surface tension of liquid, increasing mixing stability of the cleaning filling liquid, and increasing filling property of the inkjet ink.

Examples of a suitable surfactant include a fluorochemical surfactant, an anionic surfactant, a cationic surfactant, a non-ionic surfactant, and an amphoteric surfactant.

The amount of the surfactant is 0.01% by mass to 5.0% by mass of the cleaning filling liquid. When the amount is within the range, increased cleaning performance is obtained.

Examples of the fluorochemical surfactant are not particularly limited, and may include a compound of structural formula (2).

Examples of the anionic surfactant include alkyallyl sulfonates, alkylnaphthalene sulfonates, alkyl phosphates, alkyl sulfates, alkyl sulfonates, alkylethersulfates, alkyl sulfosuccinates, alkylestersulfates, alkylbenzenesulfonates, alkyldiphenylether disulfonates, alkylarylether phosphates, alkylarylether sulfates, alkylarylether ester sulfates, olefin sulfonates, alkane olefin sulfonates, polyoxyethylene alkylether phosphates, polyoxyethylene alkylether sulfates, ether carboxylates, sulfosuccinates, α-sulfo fatty acid esters, fatty acid salts, condensation products of higher fatty acids and amino acids, and naphthanates.

Examples of the cationic surfactant include alkyl amine salts, dialkyl amine salts, aliphatic amine salts, benzalkonium salts, quaternary ammonium salts, alkyl pyridinium salts, imidazolinium salts, sulfonium salts, and phosphonium salts.

Examples of the nonionic surfactant include polyoxyethylene alkyl ethers, polyoxyethylene alkylallyl ethers, polyoxyethylene alkylphenyl ethers, polyoxyethylene glycol esters, polyoxyethylene fatty acid amides, polyoxyethylene fatty acid esters, polyoxyethylene polyoxypropylene glycol, glycerin esters, sorbitan esters, sucrose esters, polyoxyethylene ethers of glycerin esters, polyoxyethylene ethers of sorbitan esters, polyoxyethylene ethers of sorbitol esters, fatty acid alkanolamides, amine oxides, polyoxyethylene alkylamines, glycerin fatty acid esters, sorbitan fatty acid esters, polyoxyethylene sorbitan fatty acid esters and alkyl (poly)glycoxides.

Examples of the amphoteric surfactant include imidazoline derivatives such as imidazolinium betaine, dimethyl alkyl lauryl betaines, alkylglycines, and alkyldi(aminoethyl) glycines.

<Additives>

The cleaning filling liquid may optionally include further additives such as a pH adjuster, an antiseptic agent, an antifungal agent, and other additives known to one of ordinary skill in the art.

Examples of the pH adjuster include hydroxides of alkali metal such as lithium hydroxide, sodium hydroxide, and potassium hydroxide; carbonates of alkali metal such as lithium carbonate, sodium carbonate, and potassium carbonate; amines such as quaternary ammonium hydroxide, diethanolamine and triethanolamine; ammonium hydroxide, and quaternary phosphonium hydroxide.

Examples of the antiseptic agent or the antifungal agent include 1,2-benzisothiazoline-3-on, sodium benzoate,

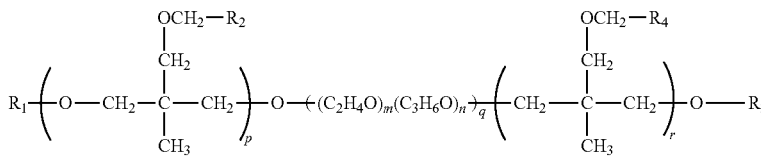

(2)

In structural formula (2), R1 and R3 denote hydrogen, an alkoxy group, or a fluorine-containing group; R2 and R4 denote a fluorine-containing group; m and n denote 0 or positive integer; and p, q, and r denote positive integer.

In structural formula (2), the alkoxy group of R1 or R3 is preferably a lower alkoxy group having 1 to 6 of carbon atom(s). The fluorine-containing group of R1 to R4 is preferably perfluoroalkyl group having 1 to 6 of carbon atom(s).

sodium dehydroacetate, sodium sorbate, sodium pentachlorophenol, and sodium 2-pyridinethiol-1-oxide.

<Inkjet Recording Apparatus>

In another embodiment, the present invention provides an inkjet recording apparatus which is applicable for the cleaning filling liquid as described hereinafter.

An inkjet recording apparatus shown in FIG. 1 includes an apparatus body 101, a feeder tray 102 attached to the apparatus body 101 for feeding papers, a paper output tray 103 attached to the apparatus body 101 for receiving papers on which images are recorded or formed, and an ink cartridge mounting part 104. An operation part 105 having operation keys and indicators is provided on the top surface of the ink cartridge mounting part 104. The ink cartridge mounting part 104 has front cover 115 that can be opened or closed to remove or place ink cartridges 201. In addition, the apparatus body 101 has an upside cover 111 and a forehead of the front cover 112.

Figure 2:
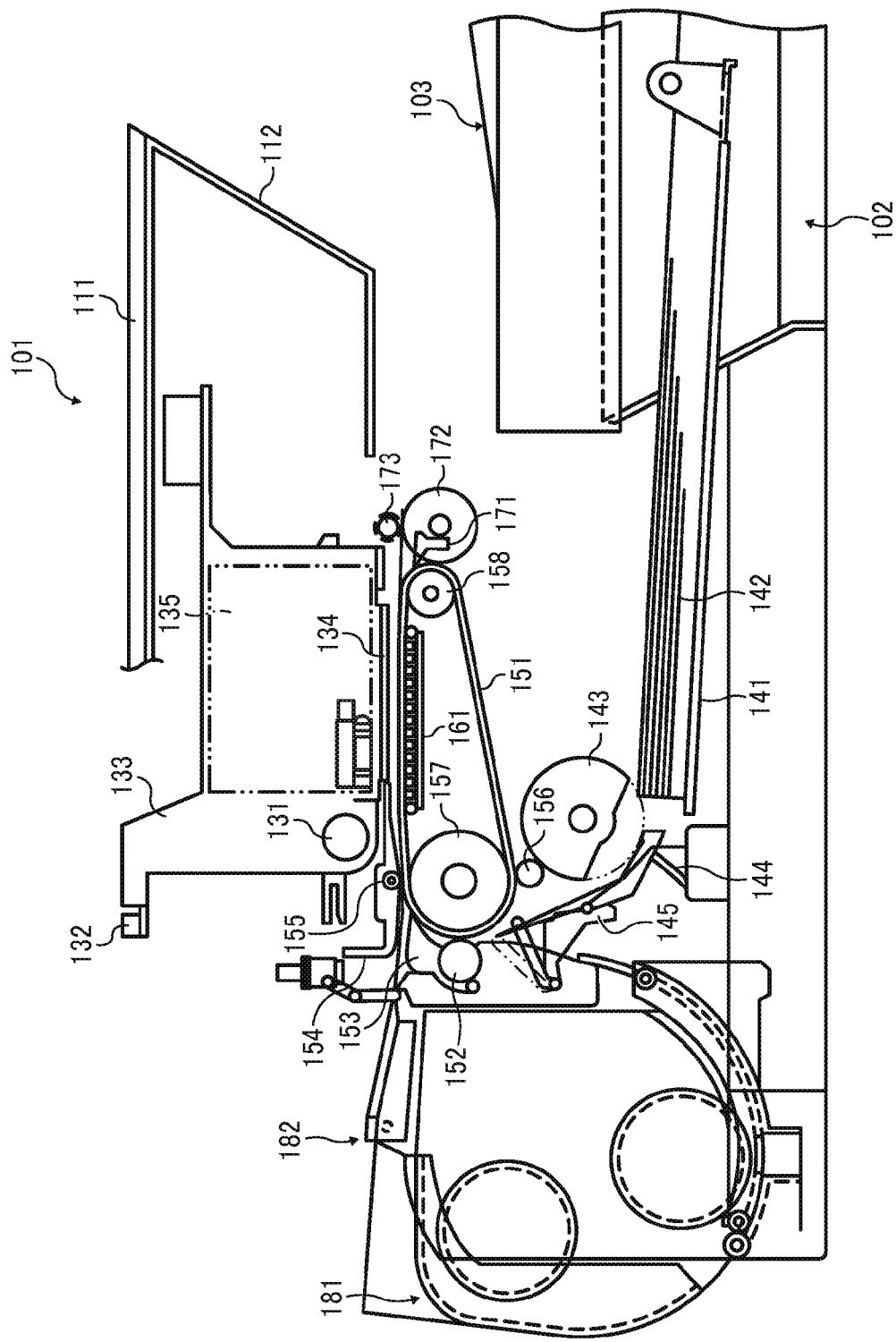
FIG. 2 schematically shows an example of an entire construction of the inkjet recording apparatus.
Figure 3:
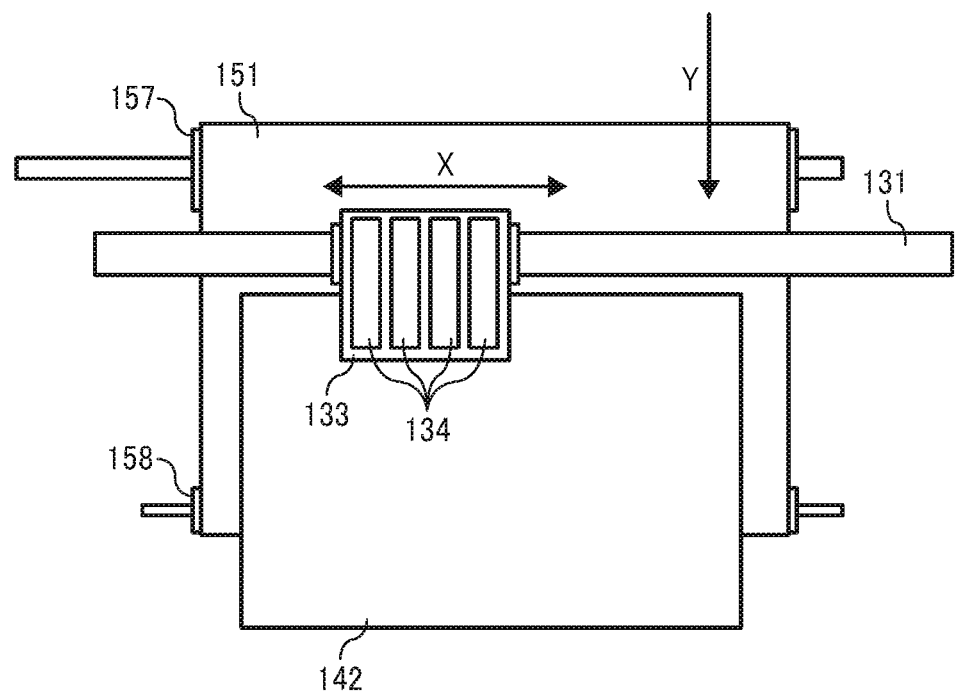
FIG. 3 schematically shows an enlarged view of an example of an inkjet head suitable for use in the inkjet recording apparatus.

As shown in FIGS. 2 to 3, a carriage 133 is supported slidably in the scan direction by guide rod 131 that is a guide member laid across right and left side plates and stay 132 and moved by a main motor in the arrowed directions (X) for scanning within the apparatus body 101.

Recording heads 134 including four inkjet recording heads that eject yellow (Y), cyan (C), magenta (M), and black (B) recording ink droplets, respectively, have ink ejection ports arranged in the intersecting direction with the main scanning direction and they are placed in the carriage 133 with their ink ejection direction downward.

Inkjet recording heads constituting the recording heads 134 are provided with an energy generation unit for ejection the ink such as a piezoelectric actuator such as an piezoelectric element, a thermal actuator using an electrothermal conversion element such as an exothermic resistor to cause film boiling and, accordingly, phase change of a liquid, a shape-memory alloy actuator using metal phase changes due to temperature changes, and an electrostatic actuator using electrostatic force.

The carriage 133 is provided with subtanks 135 for supplying each color ink to the recording heads 134. The subtanks 135 are filled with the ink according to the present invention from the ink cartridge 201 mounted in the ink cartridge mounting part 105 via a ink supply tube.

A paper feed part for feeding paper 142 stuck on paper load part 141, i.e. platen, of the feed tray 102 includes a half-moon roller, i.e. feed roller 143, that separates and supplies the paper 142 from the paper load part 141 one by one and separation pad 144 that faces the feed roller 143 and is made of a large friction coefficient material. The separation pad 144 is biased toward the feed roller 143.

A conveying part for conveying the paper 142 supplied from the feed part underneath the recording heads 134 includes a conveying belt 151 for electrostatically adsorbing and conveying the paper 142, counter roller 152 for conveying the paper 142 sent from the paper feed part via guide 145 by clamping it together with the conveying belts 151, conveying guide 153 for turning the paper 142 sent nearly vertically by 90° so as to lay it on the conveying belt 151, and leading end pressure roller 155 that is biased toward the conveying belt 151 by presser member 154. Charging roller 156 that is a charging unit for charging the surface of the conveying belt 151 is also provided.

The conveying belt 151 is an endless belt, being placed over conveying roller 157 and a tension roller 158 and running around in the belt conveying direction (Y). For example, the conveying belt 151 has a front layer that is a paper adsorbing surface made of a dragging-uncontrolled resin, for example a copolymer of tetrafluoroethylene and ethylene (ETFE), having a thickness of 40 μm, and a back layer, i.e. an intermediate dragging layer or an earth layer, made of the same material as the front layer, but dragging-controlled with carbon. Guide member 161 is provided behind the conveying belt 151 at the corresponding position to the printing area by the recording heads 134. An output part for discharging the paper 142 on which recording was done by the recording heads 134 includes separation click 171 for separating the paper 142 from the conveying belt 151, paper output roller 172, and paper output roller 173. Paper output tray 103 is disposed below paper output roller 172.

Double-side feeding unit 181 is detachably mounted in the back of the apparatus body 101. The double-side feed unit 181 takes in the paper 142 that is moved backward as the conveying belt 151 is rotated in the reverse direction, turns it over, and feeds it again between the counter roller 152 and the conveying belt 151. Manual feeder 182 is provided on the top surface of the double-side feed unit 181.

In this inkjet recording apparatus, the paper 142 is separated and fed from the paper feed part one by one. Being fed vertically, the paper 142 is guided by the guide 145 and conveyed between the conveying belt 151 and the counter roller 152. Then, it is guided by the conveying guide 153 at the leading end and is pressed against the conveying belt 151 by the leading end pressure roller 155 to change the convey direction substantially by 90°.

Meanwhile, the conveying belt 151 is charged by the charging roller 156, and the paper 142 is electrostatically adsorbed and conveyed by the conveying belt 151. Then, the recording heads 134 are driven according to image signals while the carriage 133 is moved. Ink droplets are ejected on the paused paper 142 for recording one-line. Then, the paper 142 is conveyed by a certain rate for recording the next line. Receiving a recording end signal or a signal indicating the rear end of the paper 142 has reached the recording area, the recording operation is terminated and the paper 142 is ejected to the paper output tray 103.

When it is detected that the remaining amount of the recording ink in the subtank 135 is nearly to the end, a certain amount of recording ink is supplied to the subtank 135 from the ink cartridge 201.

In this inkjet recording apparatus, when the recording ink in the ink cartridge 201 of the present invention is used up, the case of the ink cartridge 201 is disassembled and only the ink pouch contained therein can be exchanged. The ink cartridge 201 allows for stable recording ink supply even in a vertical and front mounting structure. Therefore, when the apparatus body 101 is installed with the top being blocked by something, for example, the ink cartridge 201 can be housed in a rack. Even if something is placed on the top surface of the apparatus body 101, the ink cartridge 201 can be easily replaced.

Here, the explanation is made with reference to an application in a serial type, i.e. shuttle type, inkjet recording apparatus in which the carriage scans is described. A line type inkjet recording apparatus having a line head is also applicable.

The inkjet ink of the embodiment is applicable to various recording in an inkjet recording system such as inkjet recording printers, facsimiles, copy machines, and printer/fax/copy complex machines.

An inkjet head of the present invention will be described below.

Figure 4:
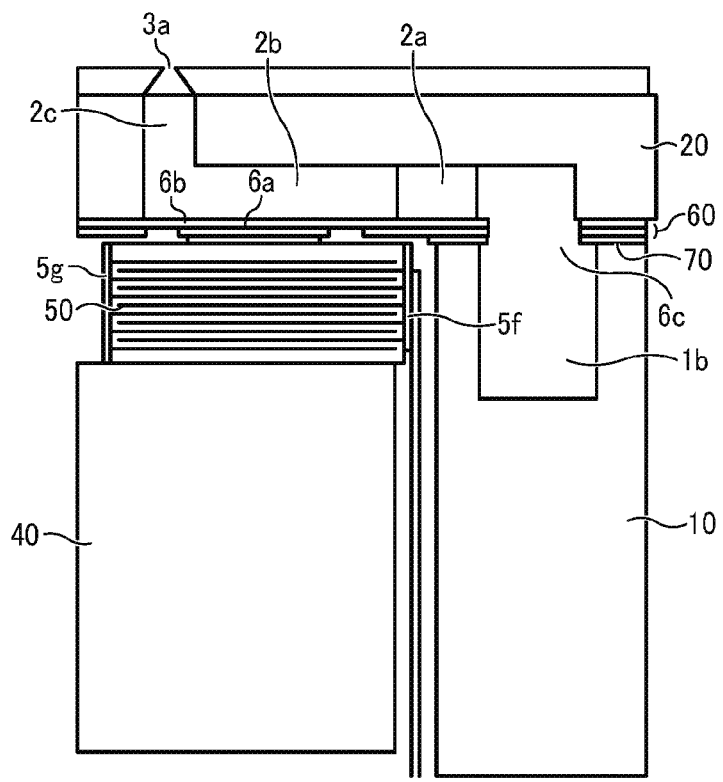
FIG. 4 shows a schematic enlarged view of an example of an inkjet head of the embodiment.
Figure 5:
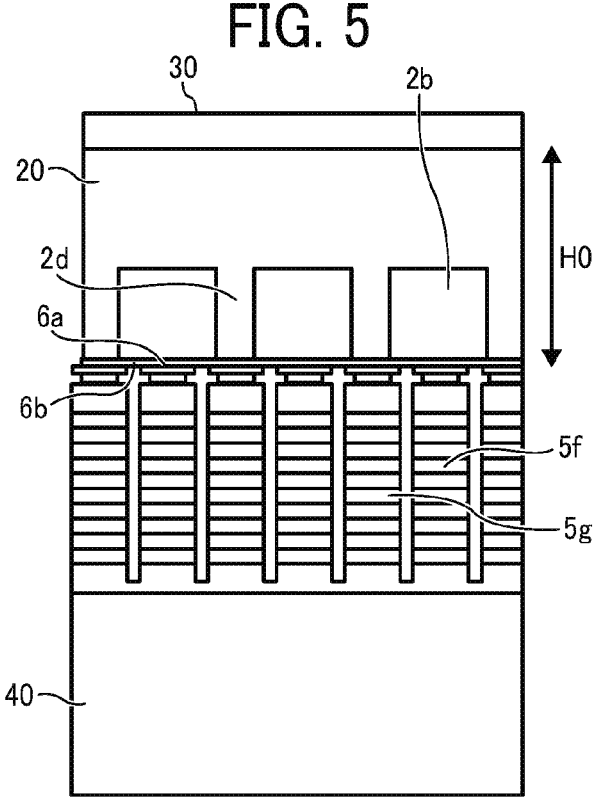
FIG. 5 shows an enlarged sectional view of an example of an inkjet head of the embodiment.

FIG. 4 shows an enlarged sectional view of an example of an inkjet head. FIG. 5 shows an enlarged sectional view of an example of the main portion of an inkjet head.

The inkjet head contains a frame 10 having formed therein a cavity serving as an ink supply port and a common liquid chamber 1b, a flow path 20 having formed therein a cavity serving as a resistance portion 2a and a pressurized liquid chamber 2b and a link port 2c linked to a nozzle 3a, a nozzle plate 30 forming the nozzle 3a, an oscillation plate 60 having a convex portion 6a, a diaphragm portion 6b and an ink inflow port 6c, a laminated piezoelectric element 50 joined with an adhesive layer 70 to the oscillation plate 60, and a base 40 that fixes the laminated piezoelectric element 50.

The base 40 is made from a barium titanate ceramic and has two laminated piezoelectric elements 50 disposed in row and joined thereto.

The laminated piezoelectric element 50 is obtained by alternately laminating piezoelectric layers of lead zirconium titanate (PZT), each having a thickness of 10 μm to 50 μm, and internal electrode layers composed of silver-palladium (AgPd), each layer having a thickness of several micrometers. The internal electrode layers are connected to the external electrodes at both ends.

The laminated piezoelectric element 50 is split in a combtooth manner by half-cut dicing, and each section is used as a drive portion 5f and a support portion 5g (non-drive portion). The external side of one of two external electrodes is restricted in length by machining such as notching so that it can be split by half-cut dicing, and the sections obtained serve as a plurality of individual electrodes. The other side is conductive, without being split by dicing, and serves as a common electrode.

An FPC is joined by soldering to individual electrodes of the drive portion. Further, in the common electrode, an electrode layer is provided at the end portion of the laminated piezoelectric element 50 and bent to joint to the ground electrode of the FPC. A Driver IC is mounted on the FPC, and drive voltage application to the drive portion 5f is controlled thereby.

The oscillation plate 60 is formed from the thin-film diaphragm portion 6b, the island-shaped convex portion (island portion) 6a that is formed in the central zone of the diaphragm portion 6b, joined to the laminated piezoelectric element 50 and serves as the drive portion 5f, a thick-film portion including a beam for connection to the support portion, and an opening serving as the ink inflow port 6c, by two-layer stacking a Ni plated film obtained by an electro forming method. The thickness of the diaphragm portion is 3 μm and the width is 35 μm (one side). Joining between the island-shaped convex portion 6a of the oscillation plate 60 and the drive portion 5f of the laminated piezoelectric element 50, and between the oscillation plate 60 and the frame 10 is performed with the patterned adhesive layer 70 including a gap material.

A silicon single-crystal substrate is used for the flow path plate 20, and the plate is patterned by an etching method to form a cavity serving as the fluid resistance portion 2a and pressurized fluid chamber 2b and a through port serving as the link port 2c in a position corresponding to the nozzle 3a.

A portion remaining after etching serves as a partition wall 2d of the pressurized fluid chamber 2b. Further, a portion of decreased etching width is provided in the head, and this portion serves as the fluid resistance portion 2a.

The nozzle plate 30 is formed of a metal material, e.g., of a Ni plated film obtained by electroforming and has a large number of nozzles 3a serving as fine discharge ports for inkjet ink droplets. The nozzles 3a are formed to have a horn-like inner (internal) shape (may also have a substantially cylindrical rod-like or barrel-like shape). The diameter of the nozzle 3a is 20 μm to 35 μm, as a diameter on the ink droplet discharge port. The nozzle pitch in each row is 150 dpi.

The ink discharging surface (nozzle surface) of the nozzle plate 30 has an ink repellent layer.

The ink repellent layer is formed of resin such as fluorine resin and silicone resin, fluorine series silane coupling agent, and metal-resin compound plating such as PTFE-Ni eutectoid plating. In this embodiment, fluorine resin and silicone resin are effectively used.

The frame 10 having formed therein a cavity serving as an ink supply port and a common liquid chamber 1b is formed by resin.

In the inkjet head of the above-descried configuration, when a drive waveform (a pulsed voltage of 10 V to 50 V) is applied to the drive portion 5f according to a recording signal, a displacement in the lamination direction is induced in the drive portion 5f, the pressurized liquid chamber 2b is pressurized via the oscillation plate 60, the pressure therein is increased, and an ink droplet is discharged from the nozzle 3a.

As the discharge of ink droplet is completed, the ink pressure inside the pressurized liquid chamber 2b is reduced, a negative pressure is generated inside the pressurized liquid chamber 2b by the inertia of ink flow and discharge process of the drive pulse, and then a transition is made to an ink filling step. At this time, the ink supplied from the ink tank flows into the common liquid chamber 1b, and the pressurized liquid chamber 2b is filled with the ink from the common liquid chamber 1b via the ink inflow port 6c and through the fluid resistance portion 2a.

The fluid resistance portion 2a effectively attenuates residual pressure oscillations after discharging and also creates resistance to a refill by surface tension. By appropriately selecting the fluid resistance portion, it is possible to attain a balance between the attenuation of residual pressure and refill, and to shorten time (drive period) to the next ink droplet discharge operation.

When the inkjet head is cleaned with the aforementioned cleaning filling liquid, vibration by tiny driving of piezoelectric actuator such as piezoelectric element may be used, wherein the vibration does not generate ejection of the cleaning filling liquid. Cleaning efficiency is enhanced by using the vibration.

The nozzle plate and inkjet head are applicable not only for the inkjet recording apparatus (image forming apparatus) but also for color filter, manufacturing device of organic electroluminescence, and the other patterning device.

The cleaning filling liquid may be filled in a cartridge that is used for maintenance. Structure of the cartridge may be same to the ink cartridge provided that the inkjet ink is replaced to the cleaning filling liquid. In this case, ink cartridge 201 in FIG. 1 may be replaced to the cartridge.

Inkjet ink used in the embodiment is explained below.

Examples of the component of the inkjet ink include a colorant, a water-soluble organic solvent, a surfactant, and the other additive such as PH adjuster, antiseptic agent, antifungal agent, antirust, water-soluble UV absorber, and water-soluble IR absorber. When the inkjet ink is dried and solid content of the inkjet ink such as colorant and resin is left, it causes jetting defect such as curving of the inkjet ink in flight. Particularly, when a pigment as the colorant or a resin emulsion as the resin is used, the solid content tends to be left and fixed, because the pigment or the resin does not dissolve but disperse in solvent. When once the resin emulsion is dried to fix, the resin emulsion can not redisperse, even if liquid for ejecting is newly supplied. In addition, the resin emulsion has adhesive performance, because the resin emulsion is used for adding adhesive property, it was very difficult to clean up the solid content, when once the resin emulsion fix to inside surface of the nozzle. However, the embodiments according to the present invention can resolve the problem.

The colorant is selected from conventionally known pigments and dyes.

Examples of an inorganic pigment include titanium oxide, iron oxide, calcium carbonate, barium sulfate, aluminum hydroxide, barium yellow, cadmium red, chrome yellow, carbon blacks manufactured by publicly known method such as contact method, thermal method, and furnace method. Examples of an organic pigment include azo pigments including azo lake pigment, insoluble azo pigment, condensed azo pigment, chelate azo pigment; polycyclic pigments such as phthalocyanine pigment, perylene pigment, perinone pigments, anthraquinone pigments, quinacridone pigments, dioxadine pigments, indigo pigments, thioindigo pigments, isoindolinone pigments and quinophthalone pigments; dye chelates including basic dye chelates and acidic dye chelates; nitro pigments; nitroso pigments; and aniline black. Among them the pigments having high affinity for solvent are preferred.

Self dispersion type pigment having functional groups such as sulfone group and carboxyl group on surface thereof to be able to disperse in water may be used. Also, pigments that are microencapsulated to be able to disperse in water may be used.

The amount of the pigment as the colorant in the inkjet ink is preferably 0.5% by mass to 25% by mass, more preferably 2% by mass to 15% by mass. Generally, when the inkjet ink has higher amount of the pigment, high quality printed image having higher image density may be provided, however, reliability such as fixablilty or jetting stability may decrease.

The particle diameter of the pigment is not particularly limited. However, the greatest frequency of the particle diameter in maximum number conversion is 20 nm to 150 nm. When the diameter is more than 150 nm, dispersion stability, jetting stability, image quality such as image density may decrease. When the diameter is less than 20 nm, storage stability and jetting stability may be obtained, but, it may not be economical, because complicate dispersion treatment or mesh control may be needed for making fine particle.

When the pigment is dispersed by a dispersant, conventionally known dispersants such as polymer dispersant or water-soluble surfactant may be used.

The inkjet ink may include a resin for increasing image fixing, image quality, and pigment dispersion property.

Examples of the hydrophilic polymers as the resin include, as naturally occurring polymers, vegetable polymers such as gum acacia, tragacanth gum, guar gum, karaya gum, locust bean gum, arabinogalactan, pectin and quince seed starch; sea weed polymers such as alginic acid, carrageenan and agar; animal polymers such as gelatin, casein, albumin and collagen; and microbial polymers such as xantene gum and dextran; as semi-synthetic polymers, cellulose polymers such as methylcellulose, ethylcellulose, hydroxyethylcellulose, hydroxypropylcellulose and carboxymethylcellulose; starch polymers such as sodium starch glycolate and sodium starch phosphate ester; and sea weed polymers such as sodium alginate and alginate propylene glycol ester; and as pure synthetic polymers, vinyl polymers such as polyacrylic acid, polymethacrylic acid, acrylic acid-acrylonitrile copolymer, vinyl acetate-acrylic acid ester copolymer, vinyl acetate-acrylic acid alkylester copolymer, styrene-acrylic acid copolymer, styrene-methacrylic acid copolymer, styrene-acrylic acid-acrylic acid alkylester copolymer, styrene-methacrylic acid-acrylic acid alkylester copolymer, styrene-α-methylstyrene-acrylic acid copolymer, acrylic acid alkylester copolymer, styrene-maleic acid copolymer, vinyl naphthalene maleic acid copolymer, vinyl acetate-ethylene copolymer, vinyl acetate-fatty acid vinyl ethylene copolymer, vinyl acetate-maleic acid ester copolymer, vinyl acetate-crotonic acid copolymer, and vinyl acetate-acrylic acid copolymer; and salt thereof.

The amount of the resin is arbitrarily selected in consideration of reliability.

The inkjet ink may include the resin which is not soluble to solvent but dispersible to solvent as fine particle of resin emulsion. The resin emulsion is composed of resin fine particles that are dispersed in a continuous phase of solvent. The resin emulsion may include a dispersant such as surfactant. The amount of resin fine particles as dispersion phase (the amount of the resin fine particle in the resin emulsion) is generally 10% by mass to 70% by mass. The average particle diameter of the resin fine particle is not particularly limited but preferably 10 nm to 1000 nm, more preferably 20 nm to 300 nm, when it is used in the inkjet recording apparatus.

The fine resin particles as dispersed phase are not particularly limited and can be appropriately selected depending on the purpose. Examples thereof include acrylic resins, vinyl acetate resins, styrene resins, butadiene resins, styrene-butadiene resins, vinyl chloride resins, acrylic/styrene resins and acrylic silicone resins. Among them, the acrylic resins are preferred. The resin emulsion is used for ensuring reliability. Commercially available resin emulsion may also be used.

Examples of the commercially available resin emulsion include Micro Gel E-100, E-2002, and E-5002 (styrene-acrylic resin emulsion, product of NIPPON PAINT Co., Ltd.), Boncoat 5454 (styrene-acrylic resin emulsion, product of Dainippon Ink and Chemicals Inc.), JONCRYL 775 (styrene-acrylic resin emulsion, product of Johnson polymer), SAE-1014 (styrene-acrylic resin emulsion, product of ZEON CORPORATION), Saibinol SK-200 (acrylic resin emulsion, product of Saiden Chemical Industry Co., Ltd.), Primal AC-22, AC-61 (acrylic resin emulsion, product of Rohm and Haas Company), NANOCRYL SBCX-2821, 3689 (acrylic silicone resin emulsion, product of TOYO INK MFG. CO. LTD.), and #3070 (methyl methacrylate polymer resin emulsion, product of Mikuni Color Ltd.).

The amount of the resin fine particle is not particularly limited but generally 0.1% by mass to 50% by mass, preferably 0.5% by mass to 20% by mass, more preferably 1% by mass to 10% by mass.

A water-soluble organic solvent, a surfactant, a pH adjuster, antiseptic agent, and antifungal agent, used in the inkjet ink are similar as those used in the cleaning filling liquid.

The aforementioned inkjet ink is made by dispersing or dissolving the components into solvent, and then mixing them as needed. A sand mill, a homogenizer, ball mill, a paint shaker, or an ultrasonic disperser may be used for dispersing. A general stirring device having stirrer, magnetic stirrer, or high speed disperser may be used for mixing.

EXAMPLES

The present invention will be more specifically explained with reference to Examples and Comparative Examples, but Examples shall not be construed to as limit the scope of the present invention in any way.

Examples 1 to 15, Comparative Example 1 to 8

Each cleaning filling liquid was obtained by mixing components shown in each column that corresponds to each Example or Comparative example in Table 1 or 2. Unit in Table 1 or 2 is % by mass. Ion-exchange water was added such that whole amount became 100% by mass.

Details of the components in Table 1 or 2 are shown below.

Polyether Modified Silicone Oil:

FZ-2123, product of Dow Corning Toray Co., Ltd Zonyl FS-300 (fluorochemical surfactant):

Product of DuPont, 40% by mass of active ingredient, polyoxyethylene perfluoroalkyl ether Softanol EP-7025 (non-ionic surfactant):

Product of NOF CORPORATION, 100% by mass of active ingredient, polyoxyethylene alkylene alkylether Unisafe A-LY (non-ionic surfactant):

Product of NOF CORPORATION, polyoxyethylene palm oil alkyl dimethylamine oxide ECTD-3NEX (anionic surfactant):

Product of Nikko Chemicals Co., Ltd, sodium polyoxyethyrene tridecyl ether acetate ECTD-6NEX (anionic surfactant):

Product of Nikko Chemicals Co., Ltd, sodium polyoxyethyrene (6) alkyl ether acetate

TABLE 1

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Amide compound structural formula (1) | 45.0 | 10.0 | 20.0 | 15.0 | 30.0 | 25.0 | 45.0 | 30.0 | 10.0 | 40.0 | 10.0 | 30.0 | 15.0 | 45.0 | 15.0 |
| Polyether modified silicone oil | | | | | | | | | | 0.5 | 1.0 | 0.1 | 5.0 | 2.5 | 7.0 |
| glycerin | | 10.0 | | | | | 5.0 | 10.0 | 10.0 | | 20.0 | | | | |
| 1,3-butanediol | | | 15.0 | | | | | | | | | | 20.0 | | 20.0 |
| 3-methyl-1,3-butanediol | | | | 10.0 | | | | 10.0 | 10.0 | | | 10.0 | | | |
| 1,5-pentanediol | | | | | 10.0 | | | | | | | | | | |
| 2-pyrrolidone | | | | | 5.0 | | | | | | | | | | |
| Zonyl FS-300 | | | | | | 1.25 | | | | | | | 0.5 | | 0.5 |
| SoftanolEP-7025 | | | | | | 0.5 | | | | | | | | | |
| Unisafe A-LY | | | | | | | 1.5 | | | | 1.5 | | | 1.5 | |
| ECTD-3NEX | | | | | | | | 1.25 | | | | | 1.0 | | |
| ECTD-6NEX | | | | | | | | | 1.25 | | | | | | |
| Ion-exchange water | rest | rest | rest | rest | rest | rest | rest | rest | rest | rest | rest | rest | rest | rest | rest |
| Whole amount | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

TABLE 2

| | Comparative example | | | | | | | |
|---|---|---|---|---|---|---|---|---|
| | 1 | 2 | 3 | 4 | 5 | 6 | 7 | 8 |
| Amide compound structural formula (1) | 50.0 | 5.0 | 0 | 0 | 5.0 | 5.0 | 50.0 | 5.0 |
| Polyether modified silicone oil | | | | | | | 2.5 | 1.0 |
| glycerin | | 25.0 | 20.0 | 15.0 | 5.0 | 25.0 | | 20.0 |
| 1,3-butanediol | | | 15.0 | | 10.0 | | | |
| 3-methyl-1,3-butanediol | | | | 15.0 | | | | |
| 1,5-pentanediol | | | | | | | | |
| 2-pyrrolidone | | | | | 5.0 | | | |
| Zonyl FS-300 | | | | | | | 1.25 | |
| SoftanolEP-7025 | | | | | | | | |
| Unisafe A-LY | | | | | | | 1.5 | 1.5 |
| ECTD-3NEX | | | 0.5 | | | | | |
| ECTD-6NEX | | | | | | | | |
| Ion-exchange water | rest | rest | rest | rest | rest | rest | rest | rest |
| Whole amount | 100.0 | 100.0 | 100.0 | 100.0 | 100.0 | 100.0 | 100.0 | 100.0 |

<Preparation of Pigment Ink>

(Preparation of Polymer Solution)

The interior of a 1-L flask equipped with a mechanical stirrer, a thermometer, a nitrogen gas introduction tube, a reflux tube, and a dropping funnel was satisfactorily replaced by nitrogen gas. The flask was charged with 11.2 g of styrene, 2.8 g of acrylic acid, 12.0 g of lauryl methacrylate, 4.0 g of polyethylene glycol methacrylate, 4.0 g of styrene macromer, 0.4 g of mercapto ethanol, and 40.0 g of methyl ethyl ketone, and the temperature of the flask was raised to 65° C.

A liquid mixture including 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobismethylvaleronitrile, and 342.0 g of methyl ethyl ketone was then added dropwise into the flask over a period of 2.5 hr.

After the completion of the dropwise addition, a mixed solution composed of 0.8 g of azobismethylvaleronitrile and 18 g of methyl ethyl ketone was added dropwise into the flask over a period of 0.5 hr. The mixture was aged at 65° C. for 1 hr. To the resultant, 0.8 g of azobismethylvaleronitrile was then added, and the resulting mixture was aged for additional 1 hr.

After the completion of the reaction, 800 g of a polymer solution having a concentration of 50% by mass was obtained.

(Preparation of Polymer Fine Particle Dispersion Liquid Including Yellow Pigment)

The polymer solution synthesized above (28 g), 26 g of Pigment Yellow 74, 13.6 g of 1 mol/L potassium hydroxide aqueous solution, 20 g of methylethyl ketone, and 13.6 g of ion exchanged water were satisfactorily stirred, and the mixture was then kneaded with a roll mill. The resultant paste was introduced into 200 g of purified water, and the mixture was satisfactorily stirred. Methyl ethyl ketone and water were removed by distillation with an evaporator to obtain polymer fine particle dispersion liquid including yellow pigment having pigment content of 15% by mass and solid content of 20% by mass.

(Preparation of Yellow Pigment Ink)

The yellow pigment ink was prepared by procedure described below.

15% by mass of 1,3-butanediol, 15% by mass of glycerin, 1% by mass of Poly Fox PF-151N manufactured by OMNOVA, and 2% by mass of octanediol were satisfactory mixed for 1 hour. Then, the 40% by mass of the polymer fine particle dispersion liquid including yellow pigment was added to the mixture, and then water was added to the mixture such that the whole amount becomes 100% by mass. Next, the mixture was mixed for 1 hour. Then large particles were removed from the mixture by pressure filtration using 0.8 μm cellulose acetate membrane filter, to obtain yellow ink for evaluation.

(Preparation of Polymer Fine Particle Dispersion Liquid Including Magenta Pigment)

The polymer solution synthesized above (17.5 g), 32.5 g of C.I. Pigment Red 122, 8.5 g of 1 mol/L potassium hydroxide aqueous solution, 13 g of methylethyl ketone, and 13.6 g of ion exchanged water were satisfactorily stirred, and the mixture was then kneaded with a roll mill. The resultant paste was introduced into 200 g of purified water, and the mixture was satisfactorily stirred. Methyl ethyl ketone and water were removed by distillation with an evaporator to obtain polymer fine particle dispersion liquid including magenta pigment having pigment content of 15% by mass and solid content of 20% by mass.

(Preparation of Magenta Pigment Ink)

The magenta pigment ink was prepared by procedure described below.

15% by mass of 3-methyl-1,3-butanediol, 15% by mass of glycerin, 0.5% by mass of Zonyl FSO-100 manufactured by Du Pont, and 1% by mass of 1,2-hexanediol were satisfactory mixed for 1 hour. Then, the 40% by mass of the polymer fine particle dispersion liquid including magenta pigment was added to the mixture, and then water was added to the mixture such that the whole amount becomes 100% by mass. Next, the mixture was mixed for 1 hour. Then large particles were removed from the mixture by pressure filtration using 0.8 μm cellulose acetate membrane filter, to obtain magenta ink for measurement.

The obtained cleaning filling liquids were evaluated using the method described below. The results are shown in table 3 to 4.

<Mixing Property Between Cleaning Filling Liquid and Inkjet Ink>

97% by mass of the cleaning filling liquid and 3% by mass of the inkjet ink were mixed, and then the mixture was left for 50 hours at 65° C. Change of appearance was evaluated by visual contact in accordance with criteria shown below.

(Evaluation Criteria)
  A: Separation was not observed
  B: Shading was observed
  C: Separation was observed <Cleaning Performance>
(Setting of Initial State)

Using inkjet printer (IPSIO GX3000, manufactured by Ricoh Company Limited), the inkjet ink in ink flow channel and head was replaced to purified water. Then, both of the black ink cartridge and cyan ink cartridge were replaced to the ink cartridges that contain the aforementioned magenta ink for evaluation respectively. Similarly, both of the magenta ink cartridge and yellow ink cartridge were replaced to the ink cartridges that contain the aforementioned yellow ink for evaluation respectively. After filling operation, head refreshing operations were subjected for 10 times to replace from the inkjet ink in the ink flow channel and head to the inkjet ink for evaluation. Then, nozzle check pattern was printed and head refreshing operations were subjected until defective pixel was not observed.

(Cleaning Treatment)

Next, all cartridges were replaced to the cartridges which contain the cleaning filling liquid, and then head refreshing operations were subjected for 6 times. Then, maintenance unit was activated to absorb 4.5 cc of cleaning filling liquid from the head for 3 times. After filling the cleaning filling liquid again, 2 cc of the cleaning filling liquid was absorbed from the head, and then nozzle surface was wiped for cleaning a channel in the inkjet printer.

(Evaluation)

Using the cleaning filling liquid which was absorbed at the last time, absorption of light was measured at 563 nm for the magenta or at 421 nm for the yellow. The amount of the fine particle as a colorant of the inkjet ink (% by mass) in the cleaning filling liquid was calculated by comparing the result with absorption of light of the inkjet inks at each same wave length. The cleaning performance was evaluated based on following criteria.

(Evaluation Criteria)
  A: less than 3% by mass
  B: not less than 3% by mass, but less than 5% by mass
  C: not less than 5% by mass <Ink Filling Property, Storage Property>

Using inkjet printer (IPSIO GX3000, manufactured by Ricoh Company Limited), the ink flow channel and head of the inkjet printer were cleaned with the cleaning filling liquid, and then same cleaning filling liquid was filled. After the nozzle was capped, the inkjet printer was left for 1 month at 50° C. and 60% RH. Then, the ink cartridges, that contain the aforementioned yellow ink or magenta ink for evaluation, were set, and ink filling operation was subjected. After, nozzle check pattern was printed, head refreshing operations were repeatedly subjected up to 8 times. The ink filling property was evaluated based on the number of head refreshing operations, until which the jetting defect was not observed. The jetting defect includes a state that white line or black line was observed due to unejecting or curving of drop in flight.

(Evaluation Criteria)
  S: head refreshing once
  A: head refreshing twice
  B: head refreshing three or four times
  C: head refreshing not less than five times, or not recovered <Fluid Resistance>
(Setting of Initial State)

φ13 of general SUS filter, which is used for inkjet printer, was cutoff. Initial fluid resistance (A) was measured by 100 mL of magenta ink to pass through the filter.

Next, the filter to which ink component and foreign substance were attached was obtained by 10 L of the magenta ink to pass through the filter at 150 mm of hydraulic head. Then, fluid resistance after 10 L passing through (B) was measured.

Appreciation rate of fluid resistance (B-A) was calculated by using the fluid resistance (A) and (B).

(Cleaning Treatment)

The filter which 10 L of magenta ink had passed through was allowed 50 ml of the cleaning filling liquid to pass through, and then 100 ml of the magenta ink to pass through. Then, fluid resistance (C) was measured.

(Evaluation)

Recovery rate of the fluid resistance was calculated by following formula.

Recovery rate (%)=[(B−C)/(B−A)×100]

(Evaluation Criteria)
S: recovery rate not less than 80%
A: recovery rate not less than 60% but less than 80%
B: recovery rate not less than 40% but less than 60%
C: recovery rate less than 40%

The miscibility with ink, the cleaning performance, the filling property were not good in Comparative examples because quantities of the amide compound were outside the range of claim 1.

What is claimed is:

1. An inkjet ink cartridge filled with a cleaning filling liquid, comprising:
   water; and
   10.0% by mass to 45% by mass per whole amount of the cleaning filling liquid of an amide compound of structural formula (1)

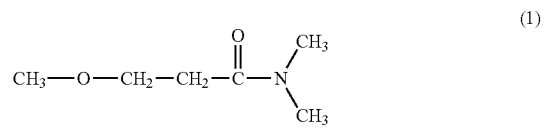

(1)

TABLE 3

| | | Example | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Miscibility whth ink | Aspect (Y) | A | A | A | A | A | A | A | A | A | A | A | A | A | A | A |
| | Aspect (M) | A | A | A | A | A | A | A | A | A | A | A | A | A | A | A |
| Cleaning performance | Density (Y) (%) | 2.62 | 2.80 | 2.64 | 2.53 | 2.43 | 2.51 | 2.13 | 2.41 | 2.47 | 2.44 | 2.36 | 2.29 | 2.38 | 2.19 | 2.67 |
| | Evaluation (Y) | A | A | A | A | A | A | A | A | A | A | A | A | A | A | A |
| | Density (M) (%) | 2.51 | 2.76 | 2.65 | 2.62 | 2.33 | 2.53 | 2.29 | 2.50 | 2.36 | 2.51 | 2.41 | 2.32 | 2.39 | 2.26 | 2.72 |
| | Evaluation (M) | A | A | A | A | A | A | A | A | A | A | A | A | A | A | A |
| Filling property/ storage property | Yellow ink | A | A | A | A | A | A | A | A | A | A | S | A | A | S | B |
| | Magenta ink | A | A | A | A | A | A | A | A | A | A | S | A | A | S | B |
| Fluid resistance | | B | B | B | B | A | A | A | A | A | A | S | A | S | S | S |

TABLE 4

| | | Comparative example | | | | | | | |
|---|---|---|---|---|---|---|---|---|---|
| | | 1 | 2 | 3 | 4 | 5 | 6 | 7 | 8 |
| Miscibility whth ink | Aspect (Y) | A | B | B | B | B | A | A | A |
| | Aspect (M) | A | B | B | B | B | A | A | A |
| Cleaning performance | Density (Y) (%) | | | | | | | 3.15 | 3.94 |
| | Evaluation (Y) | | | | | | | A | B |
| | Density (M) (%) | | | | | | | 3.03 | 3.78 |
| | Evaluation (M) | | | | | | | A | B |
| Filling property/ storage property | Yellow ink | C | C | C | C | B | B | C | B |
| | Magenta ink | C | C | C | C | B | B | C | B |
| Fluid resistance | | | | | | | | A | A |

As can be seen from Table 3 and 4, the miscibility with ink, the cleaning performance, and the filling property were good in Examples 1 to 15 due to containing appropriate quantities of amide compound having structural formula (1).

The filling property and prevention effect of fluid resistance were better in Examples 11 and 14 due to containing appropriate quantities of silicone oil.

2. A method for cleaning an ink flow channel of an inkjet device, comprising:
   passing a cleaning filling liquid through the ink flow channel;
   filling the ink flow channel with the cleaning filling liquid; and
   removing the cleaning filling liquid from the flow channel;
   wherein the cleaning filling, liquid comprises:
     water; and
     10.0% by mass to 45% by mass per whole amount of the cleaning filling liquid of an amide compound of structural formula (1)

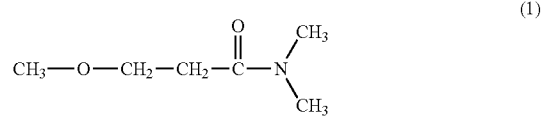

(1)

and wherein the cleaning filling, liquid does not comprise a colorant.

and wherein the cleaning filling liquid does not comprise a colorant, and
the cartridge is suitable for cleaning a print head of an inkjet device.

3. The method according to claim 2, wherein the cleaning filling liquid further comprises a silicone oil.

4. The method according to claim 3, wherein a content of the silicone oil in the cleaning filling liquid is from 0.1 to 5.0% of the total weight.

5. The method according to claim 3, wherein the silicone oil is a polyether modified silicone oil.

6. The method according to claim 5, wherein the cleaning filling liquid further comprises a surfactant.

7. The method according to claim 6, wherein the surfactant is a non-ionic surfactant.

8. The method according to claim 7, wherein the non-ionic surfactant is a polyoxyethylene palm oil alkyl dimethylamine oxide.

9. The method according to claim 3, wherein the cleaning filling liquid further comprises a water-soluble organic solvent.

10. The method according to claim 9, wherein the water-soluble organic solvent is at least one solvent selected from the group consisting of glycerin, 1,3-butanediol, 3-methyl-1,3-butanediol, 1,5-pentanediol and 2-pyrrolidone.

11. The method according to claim 3, wherein the inkjet device is an inkjet ink cartridge.

12. The method according to claim 2, wherein the inkjet device is an inkjet ink cartridge.

13. The method according to claim 2, wherein the cleaning filling liquid consists essentially of water; and
    10.0% by mass to 45% by mass per whole amount of the cleaning filling liquid of the amide compound of structural formula (1)

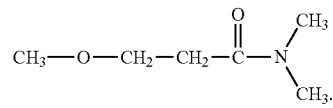

(1)

* * * * *